(12) United States Patent
Duemler

(10) Patent No.: US 7,003,733 B2
(45) Date of Patent: Feb. 21, 2006

(54) PROGRAMMABLE LOGIC CONTROLLER PROGRAMMING SYSTEM

(76) Inventor: David W. Duemler, 4376 Upper Ridge Rd., Pennsburg, PA (US) 18073

( * ) Notice: Subject to any disclaimer, the term of this patent is extended or adjusted under 35 U.S.C. 154(b) by 463 days.

(21) Appl. No.: 09/772,493

(22) Filed: Jan. 30, 2001

(65) Prior Publication Data

US 2002/0101451 A1    Aug. 1, 2002

(51) Int. Cl.
*G06F 3/00*    (2006.01)
*G05B 11/01*    (2006.01)

(52) U.S. Cl. ......................................... 715/805; 700/18
(58) Field of Classification Search .................. 702/81, 702/84; 700/18, 86, 87, 70, 83, 23, 11; 715/805, 715/513, 501.1, 174–178; 709/201, 203–206, 709/217, 219, 245, 248; 713/201, 526; 345/326, 345/805, 705–715, 331, 332
See application file for complete search history.

(56) References Cited

U.S. PATENT DOCUMENTS

| | | | |
|---|---|---|---|
| 4,227,247 A | 10/1980 | Kintner | |
| 4,358,275 A * | 11/1982 | Paraghamian et al. | 434/258 |
| 4,396,974 A | 8/1983 | Imazeki et al. | |
| 4,449,180 A | 5/1984 | Ohshima et al. | |
| 4,513,379 A | 4/1985 | Wilson et al. | |
| 4,533,997 A | 8/1985 | Fergerson | |
| 4,663,704 A | 5/1987 | Jones et al. | |
| 4,991,076 A | 2/1991 | Zifferer et al. | |
| 5,038,318 A | 8/1991 | Roseman | |
| 5,062,052 A | 10/1991 | Sparer et al. | |
| 5,127,099 A | 6/1992 | Zifferer et al. | |
| 5,225,975 A * | 7/1993 | Gates et al. | 700/18 |
| 5,237,652 A | 8/1993 | McManus | |
| 5,321,829 A | 6/1994 | Zifferer | |
| 5,349,518 A | 9/1994 | Zifferer et al. | |
| 5,392,130 A * | 2/1995 | Mahoney | 358/400 |
| 5,576,946 A | 11/1996 | Bender et al. | |
| 5,867,382 A * | 2/1999 | McLaughlin | 700/17 |
| 5,872,974 A * | 2/1999 | Mezick | 717/109 |
| 5,917,483 A * | 6/1999 | Duncan et al. | 345/802 |
| 6,249,355 B1 * | 6/2001 | Trask | 358/1.9 |
| 6,535,882 B1 * | 3/2003 | Pasquali | 707/10 |
| 6,678,636 B1 * | 1/2004 | Coleman et al. | 702/182 |

OTHER PUBLICATIONS

"RSLogix 500™ Programming for the SLC 500™ and MicroLogix™ Families, Getting Results Guide," Rockwell Software, Aug. 1999, 70 pages.

* cited by examiner

*Primary Examiner*—Sy D. Luu
*Assistant Examiner*—Lê Nguyen
(74) *Attorney, Agent, or Firm*—Duane Morris LLP

(57) ABSTRACT

A programming system includes a graphical data entry user interface for a plurality of sequential steps displayed to a user on a monitor. The user selects outputs to be activated for each of the sequential steps and any inputs to be monitored or timer to be enabled for the sequential steps. The inputs, outputs, and timer enable commands, and timer values identified by the user are converted into data tables each having a plurality of data elements. Each data element corresponds to one of the sequential steps. A programmable logic controller directs a process by reading the data elements corresponding to a sequential step and, for that sequential step, activating the outputs identified by the output data element, monitoring any inputs identified by the input control data element, and enabling a timer for a selected time period if identified in the input control data element.

45 Claims, 6 Drawing Sheets

| | |
|---|---|
| TIMER0 | Timer value: STEP0 |
| TIMER1 | Timer value: STEP1 |
| TIMER1 | Timer value: STEP2 |
| ...... | |
| TIMER31 | Timer value: STEP31 |

FIG. 4

| | |
|---|---|
| WORD10 | Output data element: STEP0 |
| WORD11 | Output data element: STEP1 |
| WORD12 | Output data element: STEP2 |
| ..... | |
| WORD41 | Output data element: STEP31 |
| WORD50 | Input control data element: STEP0 |
| WORD51 | Input control data element: STEP1 |
| WORD52 | Input control data element: STEP2 |
| ..... | |
| WORD81 | Input control data element: STEP31 |

FIG. 3

PROGRAMMABLE LOGIC CONTROLLER PROGRAMMING SYSTEM

FIELD OF THE INVENTION

The present invention relates to programmable logic controller systems, and more particularly to methods and apparatuses for programming programmable logic controllers and methods and apparatuses for directing processes through programmed programmable logic controllers.

BACKGROUND OF THE INVENTION

Programmable logic controllers (PLCs) are special data processors that are often used as controllers for machines in industrial processes. A PLC is typically programmed with a sequential program for controlling a machine, such as a pressing or marking machine, that continuously repeats the same motions during, for example, an automated assembly process or other manufacturing process.

Each PLC operates under the control of a program stored in its memory. The program responds to input signals registered at the inputs of the PLC and controls an associated piece of machinery through output signals at the outputs of the PLC.

The program stored in the memory of the PLC and used by the PLC to control its operation is typically expressed in what is termed "ladder logic." Each ladder logic program comprises one or more ladder logic statements. In the PLC art, these ladder logic statements are often termed "rungs." Each ladder logic statement defines the relationship between an output variable and, in most cases, one or more input variables. Input variables include variables corresponding to the inputs of the PLC, and output variables include variables corresponding to the signals at the output terminals of the PLC. Ladder logic statements and programs are often expressed in terms of ladder logic graphs, such as shown and described in U.S. Pat. No. 5,237,652 to McManus, the entirety of which is hereby incorporated herein by reference.

Currently, at the design stage for a process, custom software is typically developed for each PLC used in the process. This software is typically written in the ladder logic format by a controls engineer, debugged, and then tested on the intended machinery. The machine and custom programmed PLC are then shipped to the customer where a maintenance person is trained to operate the machine, often with extensive training on the custom program and ladder logic programming generally.

This programming system and method suffer from several drawbacks. First, a programmer must be proficient in ladder logic programming in order to program the PLC to operate a piece of machinery. This programmer must, therefore, also be proficient in ladder logic programming in order to debug the program and identify the cause of malfunctions during operation of the machine controlled by the PLC. Also, even slight changes in the operating parameters of the machine require development of a new control program for the PLC. This dependence upon familiarity with the ladder logic programming system leads to time consuming development and debugging of control programs by one having intimate knowledge of ladder logic programming. This dependence, in turn, also forces many businesses to specially order programmed PLCs and PLC controlled machinery and/or staff an employee familiar with ladder logic programming.

Therefore, there remains a need for an improved system for programming PLCs that provides for a simplified method of programming a PLC. Still further, there remains a need for a PLC which does not require complete reprogramming of the PLC to accommodate changes in the operating parameters of a controlled piece of machinery.

SUMMARY OF THE INVENTION

The present invention is a method and apparatus for controlling a process with a programmable logic controller that includes a plurality of inputs and a plurality of outputs. The programmable logic controller directs the process through signals at the outputs in response to input signals at the inputs. The programmable logic controller accesses an input control data element for a sequential step and an output data element for the step from an input control data table and an output data table, respectively. The input control data table includes input control data elements for a plurality of sequential steps that include the sequential step and the output data table includes a plurality of output data elements for the plurality of sequential steps. The programmable logic controller provides output signals at outputs of the programmable logic controller identified by the output data element to be activated for the sequential step. The programmable logic controller also monitors inputs identified by the input control data element to be monitored for the sequential step and performs a next one of the plurality of sequential steps if an input signal is detected for at least one of the monitored inputs.

Another aspect of the invention is an apparatus and method for programming the programmable logic controller. A graphical data entry user interface is displayed to a user on a monitor for a plurality of sequential steps. The graphical data entry user interface represents respective inputs to be monitored by the programmable logic controller at each of the sequential steps and respective outputs to be initiated by the programmable logic controller at respective ones of the sequential steps. An identification of at least one input selected by the user to be monitored for at least one of the sequential steps and an identification of at least one output selected by the user to be initiated for the at least one of the sequential steps is received via the graphical data entry user interface. The identification of the at least one input selected by the user is converted into an input control data table. The input control data table includes a plurality of input control data elements. Each of the input control data elements corresponds to a respective one of the plurality of sequential steps and a respective one the input control data elements represents the at least one input selected by the user. The identification of the at least one output selected by the user is converted into an output data table. The output data table includes a plurality of output data elements. Each of the output data elements corresponds to a respective one of the plurality of sequential steps. A respective one of the output data elements represents the at least one output selected by the user.

The above and other features of the present invention will be better understood from the following detailed description of the preferred embodiments of the invention that is provided in connection with the accompanying drawings.

BRIEF DESCRIPTION OF THE DRAWINGS

FIG. 3 is an illustration of an exemplary input control and output data table for the system of FIG. 1;

FIG. 4 is an exemplary timer value data table for the system of FIG. 1; and

DETAILED DESCRIPTION OF THE PREFERRED EMBODIMENTS

The apparatus and method for controlling a process allow the operating parameters of a programmable logic controller to be reconfigured simply by manipulating the data elements of the input control data table and output data table. No reprogramming, other than this manipulation, is required for the PLC control program, thereby relieving operators of their dependence on ladder logic programming and debugging as well as eliminating the need to order custom programmed PLCs. Further, an operator does not have to search a complex ladder logic program to identify sources of operational faults.

The exemplary embodiment of the present invention described herein allows for the programming of a programmable logic controller using a user friendly graphical interface without any knowledge of ladder logic programming by the programmer. Programming time is greatly reduced and the debugging process is simplified. The operating parameters of a programable logic controller executing instructions from input control data table and output data table may be quickly programmed or reconfigured simply by generating or modifying the input control data tables and output data tables using the method and apparatus of the exemplary embodiment. Further, reductions in software development time lead to a greater ability to meet increasing demands to push products to market faster, as well as a more flexible and adaptable product.

Figure 1:
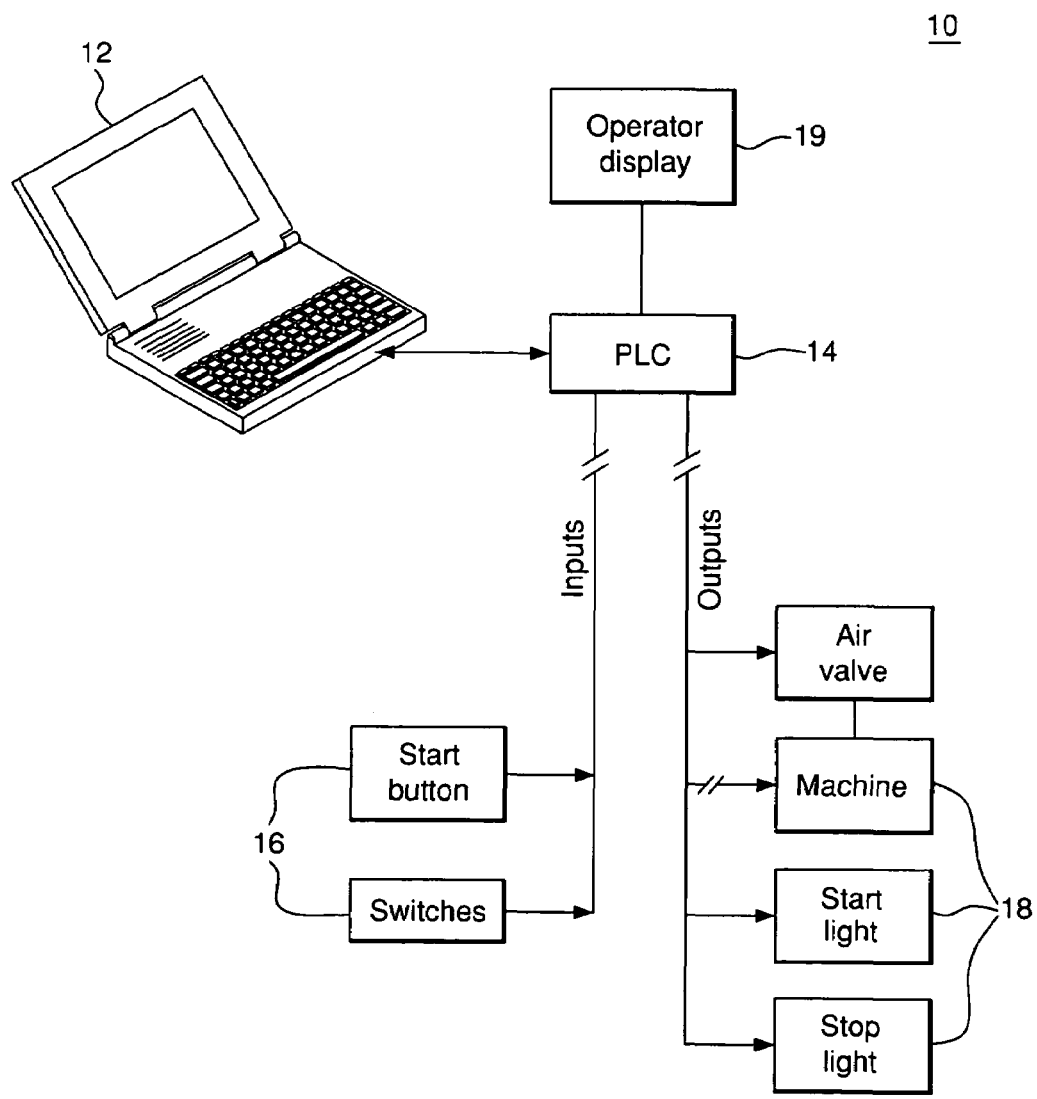
FIG. 1 is a block diagram of an exemplary programmable logic controller programming and control system according to the present invention.

FIG. 1 is a block diagram of an exemplary embodiment of a programmable logic controller programming and control system 10 according to the present invention. A programmable logic controller (PLC) 14 includes a plurality of inputs coupled to a plurality of input devices 16, such as a start button and various switches. The PLC 14 also includes a plurality of outputs coupled to a plurality of output devices, such a start light, a stop light, air valve, motor or an industrial machine such as, but not limited to, a pick-and-place station, part presence probe, O-ring loader, ultra-sonic welder, part torque or screw station, empty nest identifier, part orientation probe, leak and flow tester, electrical characteristic tester, pneumatic ram, crimper and former, liquid dispenser, glue dispenser, ultra violet gluer, machining device, soldering device, grinder, finishing and polishing device, and charger, to name a few. An operator display 19 is coupled to the PLC 14. The operator display 19 allows the PLC 14 to communicate messages to a user during operation, such as alarms, error default messages, status, cycle times, and other information.

Figure 2:
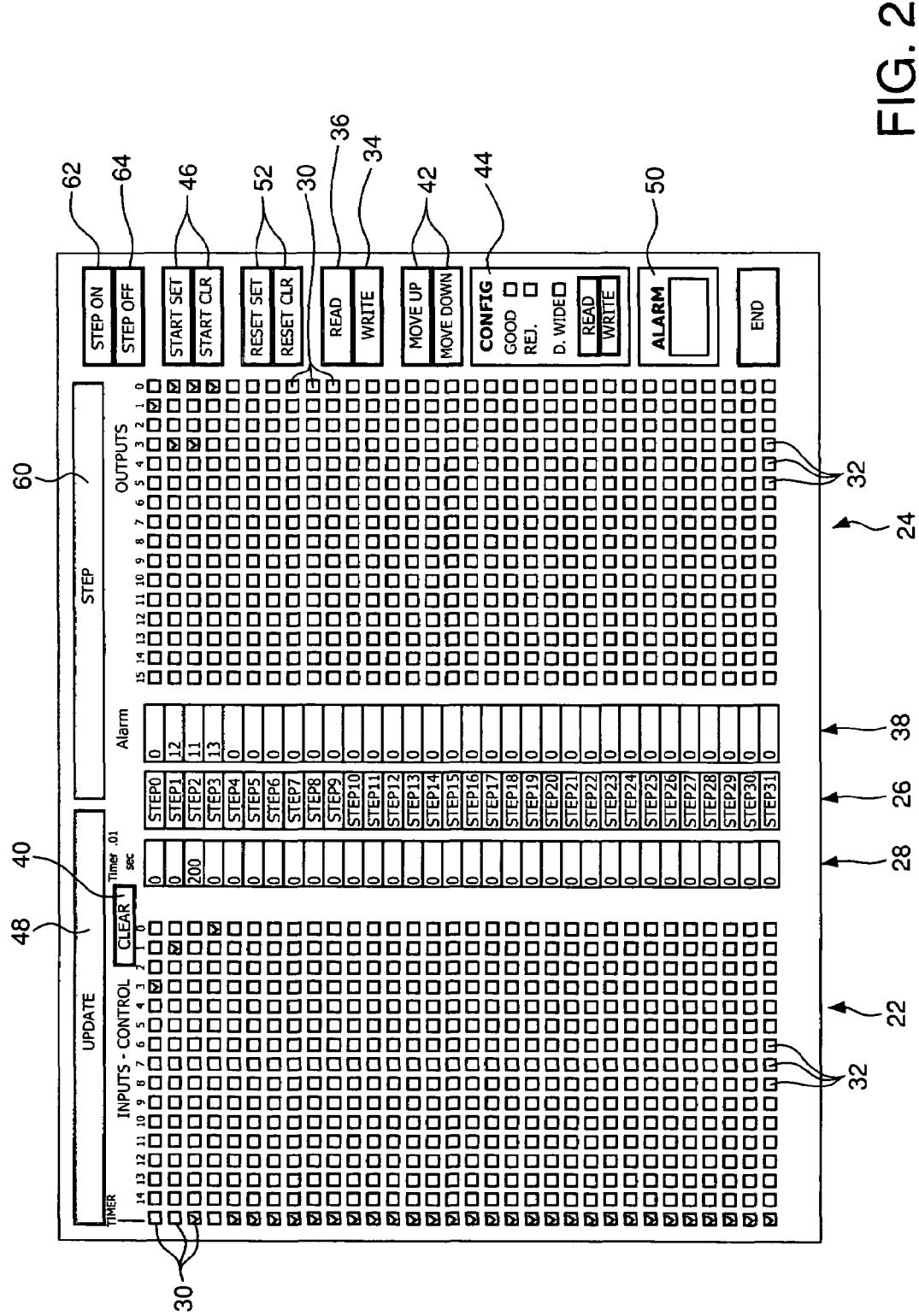
FIG. 2 is an exemplary graphical data entry user interface for the system of FIG. 1.

FIG. 2 illustrates an exemplary graphical data entry user interface 20 for the PLC 14. The user interface 20 is preferably generated on a monitor coupled to a computer 12 programmed with programming interface software. The software may be written in any of numerous programming languages, but is preferably written in a window based programming language. An example of one preferred programming language is visual basic.

In one exemplary embodiment of the present invention, a graphical data entry user interface 20 is displayed in a windows environment that provides for simplified configuration and navigation. An exemplary interface 20 includes an input control grid 22 and an output grid 24. Each line 30 of the input control grid 22 and output grid 24 is associated with a step 26. The user interface 20 of FIG. 2 provides thirty-two programmable steps 26 labeled "STEP0" through "STEP31," although the present invention is in no way limited to the number of steps 26 shown in the exemplary interface 20 of FIG. 2.

An exemplary input control grid line 30 for each step 26 includes sixteen checkboxes 32, and an exemplary output grid line 30 for each step 26 includes sixteen checkboxes 32. Each of these checkboxes 32 may be checked or un-checked by a user simply by "clicking" on a selected checkbox 32 using a pointing device, such as a mouse operating in a windows environment. Each checkbox 32 of a line 30 of the output grid 24 represents a different output of the PLC 14. Similarly, each checkbox 32 of a line 30 of the input control grid 22 represents a different input of the PLC 14 or other control command for the PLC 14, as is described below.

It should be understood that the invention is in no way limited to the use of checkboxes to represent discrete inputs and outputs. For example, the user could input 1's and 0's to represent the present of a "check" and the absence of a "check," respectively.

The interface 20 of FIG. 2 is shown with the input control grid 22 and output grid 24 already configured for illustrative purposes. Referring to STEP0 and output grid 24, the checkbox 32 for output one is checked, and the remaining checkboxes 32 of output grid line 30 corresponding to STEP0 are un-checked. This configuration for the output grid line 30 for STEP0 indicates that an output signal should be produced by the PLC 14 at its first output at STEP0, i.e., output one is turned "on", and that all other outputs of the PLC 14 should remain "off" at STEP0. The input control grid line 30 of input control grid 22 for STEP0 indicates with a check placed in the input control checkbox 32 for input three that the PLC 14 should remain at STEP0 until an input signal is detected at input three of the PLC 14. Once an input signal is detected at input three, the PLC 14 should execute STEP1.

The configuration of the output grid line 30 for STEP1 indicates that outputs zero and three should be turned on by the PLC 14 at STEP1, output one should be turned off (i.e., output one is not checked), and all of the other outputs should remain off. The input control grid line 30 for STEP1 indicates that the PLC 14 should not execute STEP2 until an input signal is detected at input one of the PLC 14.

At STEP2, the configuration of the output grid line 30 of output grid 24 indicates that outputs zero and three remain on while the PLC 14 executes STEP2. A timer enable command checkbox 32 is checked in the input control grid line 30 of the input control grid 22 for STEP 2. When the PLC 14 executes STEP2, it enables a timer in the PLC 14. A timer value 28 of "200" is shown selected for STEP2. The timer value 28, may be, for example, expressed as a multiple of a fraction of a second, e.g., a multiple of 0.01 second as shown in interface 20. By checking the timer enable checkbox for STEP2 and by entering "200" for the timer value 28, the user directs that the PLC 14 should wait two seconds (200 times 0.01 second) at STEP2 before proceeding to STEP3. During this time, as mentioned above, outputs zero and three remain on.

The output grid line 30 for STEP3 has only the output checkbox 32 for output zero selected. Once the PLC 14 increments to execute STEP3, therefore, output zero is turned on, or more specifically output zero remains on from STEP 2, output three is turned off, and the remaining outputs remain off. The input control grid line 30 for STEP3 indicates that the PLC 14 should not increment to STEP4 until an input signal is detected at input zero.

The remaining steps shown in the user interface 20 of FIG. 2 are timing steps, as indicated by the selection or check of the timer enable box of each input control grid line 30 for STEP 4 through STEP 31. The timer value for each of these steps, however, is set at "0." Therefore, the PLC 14 is directed to simply skip through STEP 4 through STEP 31 and begin again at STEP0, described above. Also, no outputs are selected for STEP 4 through STEP 31, meaning output zero is turned off after STEP3 and no output signals are produced at outputs zero through fifteen until the PLC 14 executes STEP0.

More complex boolean steps may be easily programmed as described below. An OR command, e.g., the PLC 14 should increment to the next step if an input signal is detected at input zero OR input one, is programmed by checking both the checkbox 32 for input zero and input one of a line 30 of input control grid 22. Also, an AND command, e.g., the PLC 14 should change its outputs only after an input signal is detected at both input zero AND input one, is programmed with two successive steps 26 where, for example, the checkbox 32 for input zero is selected for a first step 26, the checkbox 32 for input 1 is selected for a second next sequential step 26, and the output grid line 30 for both steps 26 are identical.

It should be apparent that even a user with no specific knowledge of ladder logic programming can easily program a sequential step process using the graphical data entry user interface 20 of FIG. 2. Once a user has configured the input control grid 22 and output grid 24 as desired, the user can select the WRITE option 34 from the user interface 20. The configured input control grid 22 is converted into an input control data table having a plurality of input control data elements. Each of the input control data elements preferably represents inputs selected by the user for an individual step 26. Likewise, the configured output grid 22 identifying the output selection of the user for each step 26 is converted into an output data table having a plurality of output data elements. Each of the output data elements represents outputs selected by the user for an individual step 26.

Each output and input data element is preferably a word having sixteen bits, but the data elements may also be expressed in other data formats. In this manner, the output data element for STEP0 may be expressed as "0100000000000000" where each bit represents one of the output checkboxes 32 from the output grid line 30 for STEP0 of the output grid 24, i.e., bit zero corresponds to output zero of the PLC 14, bit one corresponds to output one of the PLC 14, etc . . . The output data element for STEP1 through STEP4 may be expressed, respectively, as follows: "1001000000000000," "1001000000000000," "1000000000000000," and "0000000000000000". It should be understood from the above description that the output data elements corresponding to the selection of the user for STEP5 through STEP31 are identical to the output data element for STEP4.

Likewise, each input control data element is preferably a word having sixteen bits. The input control data element for STEP0 may be expressed as "0001000000000000." The input control data elements for STEP1 through STEP4 may be expressed, respectively, as follows: "0100000000000000," "0000000000000001," "1000000000000000," and "0000000000000001". Again, it should be apparent from the above description that the input control data elements for STEP5 through STEP31 are identical to the input control data element for STEP4.

An exemplary input control data table and output data table are shown in FIG. 3. The tables are preferably downloaded to the local memory of the PLC 14 from computer 12 using the WRITE command 34 of the interface 20. In this manner, the interface 20 acts as a window into the data tables utilized by the PLC 14 to control its operation, and the interface 20 serves as a graphical representation of the data tables. Similarly, the tables may be read from the local memory of the PLC 14 using the READ command 36 of interface 20 and reconverted into a display, such as shown in FIG. 2, of interface 20. The output data elements for STEP0 through STEP31 are stored as WORD10 through WORD41, respectively. Input control data elements for STEP0 through STEP31 are stored as WORD50 through WORD81, respectively. It should be apparent to one skilled in the programmable logic controller art that the memory allocations of FIG. 3 are illustrative of only one possible memory allocation for the input control data table and output data table, and other configurations which provide the PLC 14 access to the input control data elements and output data elements fall within the scope of the present invention.

Likewise, FIG. 4 illustrates only one possible exemplary timer value data table for the timer values of STEP0 through STEP31, and it should be apparent that other configurations which provide the programmable logic controller 14 access to the timer value data elements fall within the scope of the present invention.

An exemplary timer value data table representing the configuration of the graphical data entry user interface 20 of FIG. 2 includes thirty-two timer value data elements. The first and second data elements, representing timer values shown in FIG. 2 for STEP0 and STEP1, respectively, have values of zero. The third data element has a value of two hundred, representing the "200" timer value entered for STEP2 in the interface 20. Timer value data elements four through thirty-one all have values of zero.

An exemplary graphical data entry user interface 20 may include other features shown in FIG. 2. For example, a CLEAR option 40 may be selected to clear the input control grids 22, output grid 24, timer values 28 and alarms 38 in order to begin a new data entry session. The MOVE UP and MOVE DOWN options 42 may be used to move data entered on a line 30 or group of lines 30, e.g., checks, timer value and alarm code (described below), either up or down on the input control grid 22 and output grid 24 in order to avoid time consuming changes to the grids 22, 24 when, for example, a step 26 is being added or eliminated from a process. In essence, the MOVE UP option 42 is a delete option and the MOVE DOWN option 42 is an insert option.

CONFIG. window 44 may be used to identify when the PLC 14 should receive a start or operate signal. Processes, such as assembly processes, often use several pieces of machinery each controlled by different PLCs 14 and disposed along an assembly line or dial indexer. Parts proceeding through the assembly line can either be characterized as "good" or "reject." Some machines operate only on "good" parts, such as glue guns, some machines operate only on "reject" parts, such as machines that prematurely remove the part from the assembly line, and some machines operate on both "good" and "reject" parts, such as machines that merely orient a part or determine a part's orientation.

A PLC 14 controlling a machine that only operates on a "reject" part should not receive a start signal, unless a part in front of it is a "reject." Likewise, a PLC 14 controlling a machine that only operates on a "good" part should not receive a start signal, unless a part in front of it is a "good" part. This start signal can come from a control processor that keeps track of the "good" and "reject" status of parts in an assembly process and communicates with a PLC 14, as described in U.S. patent application Ser. No. 09/522,633, to David W. Duemler, filed Mar. 3, 2000 and entitled "Modular Automated Assembly System," (the "'633 application") the entire disclosure of which is hereby incorporated by reference herein. A user can select in window 44 whether the PLC 14 is controlling a machine that cycles on a "good" part by checking the GOOD checkbox, a "reject" part by checking the REJ. checkbox, or both a "good" and a "reject" part by checking both the GOOD and REJ. checkboxes. During the assembly process, each PLC 14 then communicates its operating characteristic to the central processor, which then sends the start signal to an individual PLC 14 only when an appropriate part is before the machine controlled by the PLC 14. The READ and WRITE options in the CONFIG. window 44 may be selected to read a configuration from a PLC and to write a configuration to a PLC, respectively. A "D WIDE" option may also be selected in the CONFIG. window 44. This selection indicates that the machine controlled by the programmed PLC is a "double wide" machine and occupies more than one machine location in the assembly process in the "Modular Automated Assembly System" of the '633 application.

The following example illustrates a press operation that may be controlled by the inputs, outputs and timers selected in the configuration shown in the user interface 20 of FIG. 2 without any complex ladder logic programming. Assume the press machinery controlled by a PLC 14 is pneumatically operated. When the operator presses a start button 16, a press valve activates and extends a press cylinder until it hits an end-of-travel limit switch. The press then remains at that position for two seconds before the cylinder retracts and hits the retract limit switch.

The operating sequence is as follows: (1) STEP0—The PLC waits for the operator to press a start button connected to input three, and a stop light connected to output one is on; (2) STEP1—A valve connected to output three is turned on, a start light coupled to output zero is on, and the PLC waits for an extend limit switch coupled to input one to be hit before executing STEP2; (3) STEP2—The valve coupled to output three continues to be on, the start light coupled to output zero remains on, and the PLC waits two seconds before executing STEP3; (4) STEP3—The press valve coupled to output three is turned off, the start light coupled to output zero continues to be on, and the PLC waits until a retract limit switch coupled to input zero is hit before executing STEP4; and (5) STEP4 through STEP31—The start light coupled to output zero is turned off, and the PLC increments from STEP4 through STEP 31 to STEP0.

Figure 5:
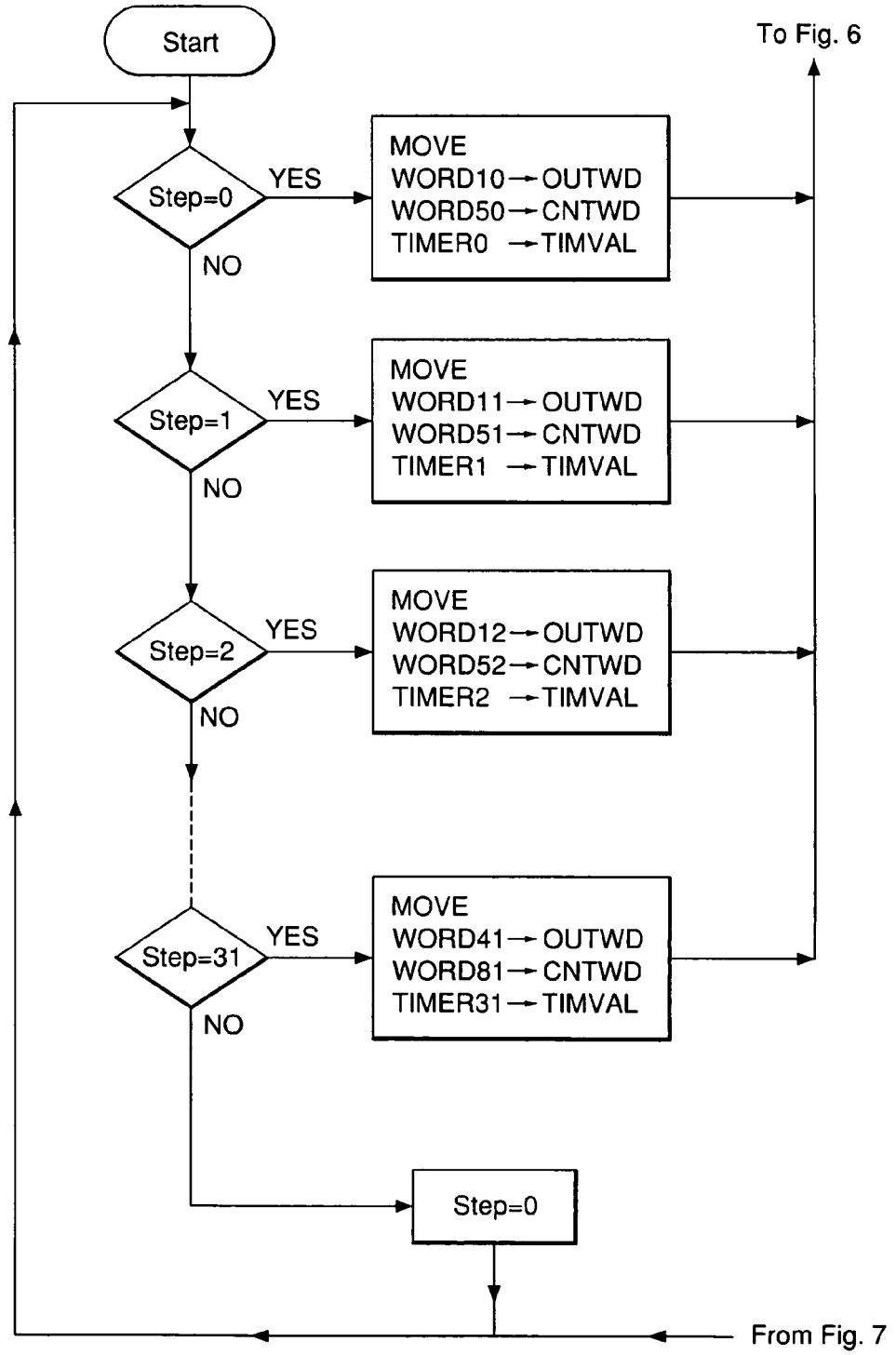
FIGS. 5–7 are flow charts illustrating the operation of the exemplary programmable logic controller of FIG. 1.
Figure 6:
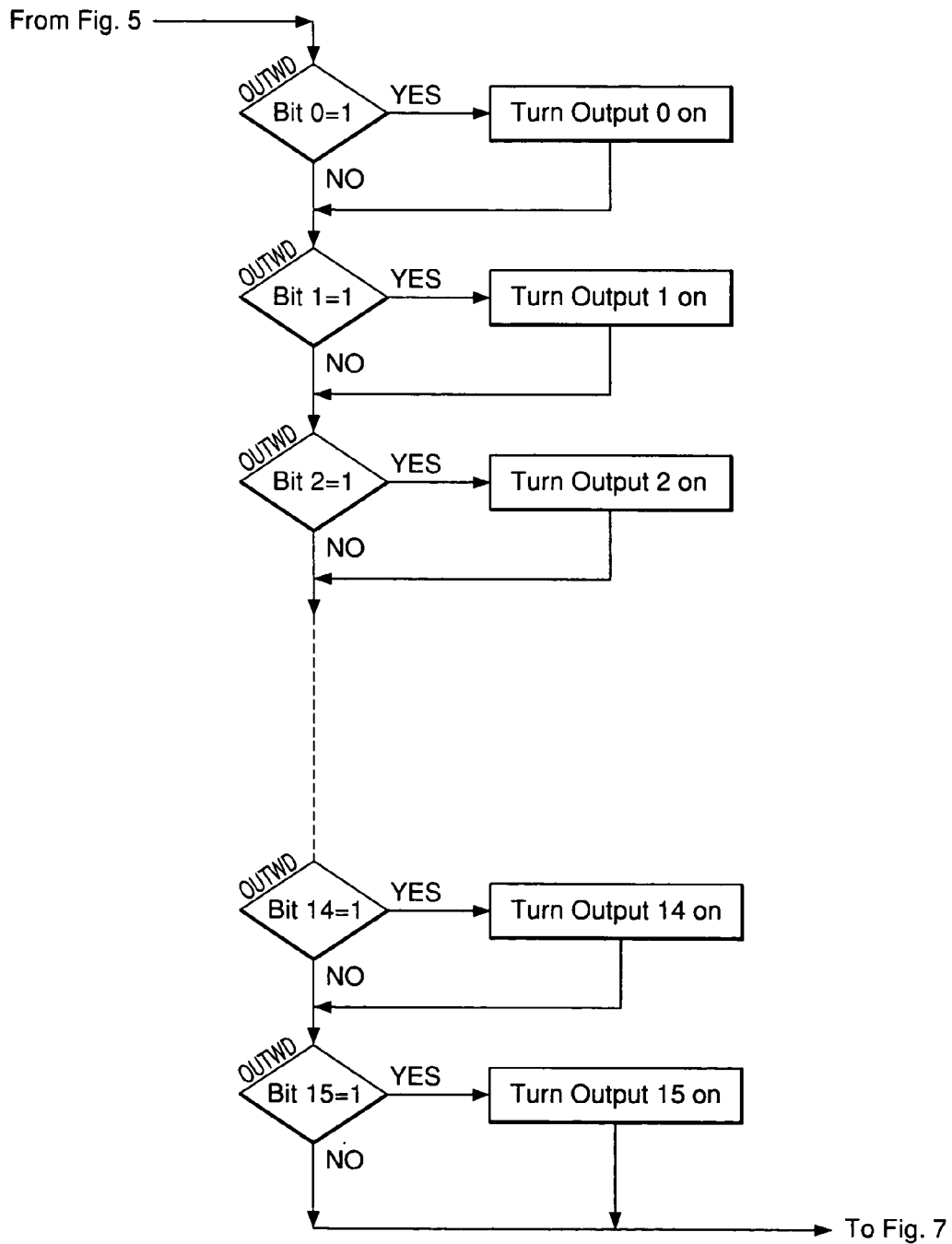
Figure 7:
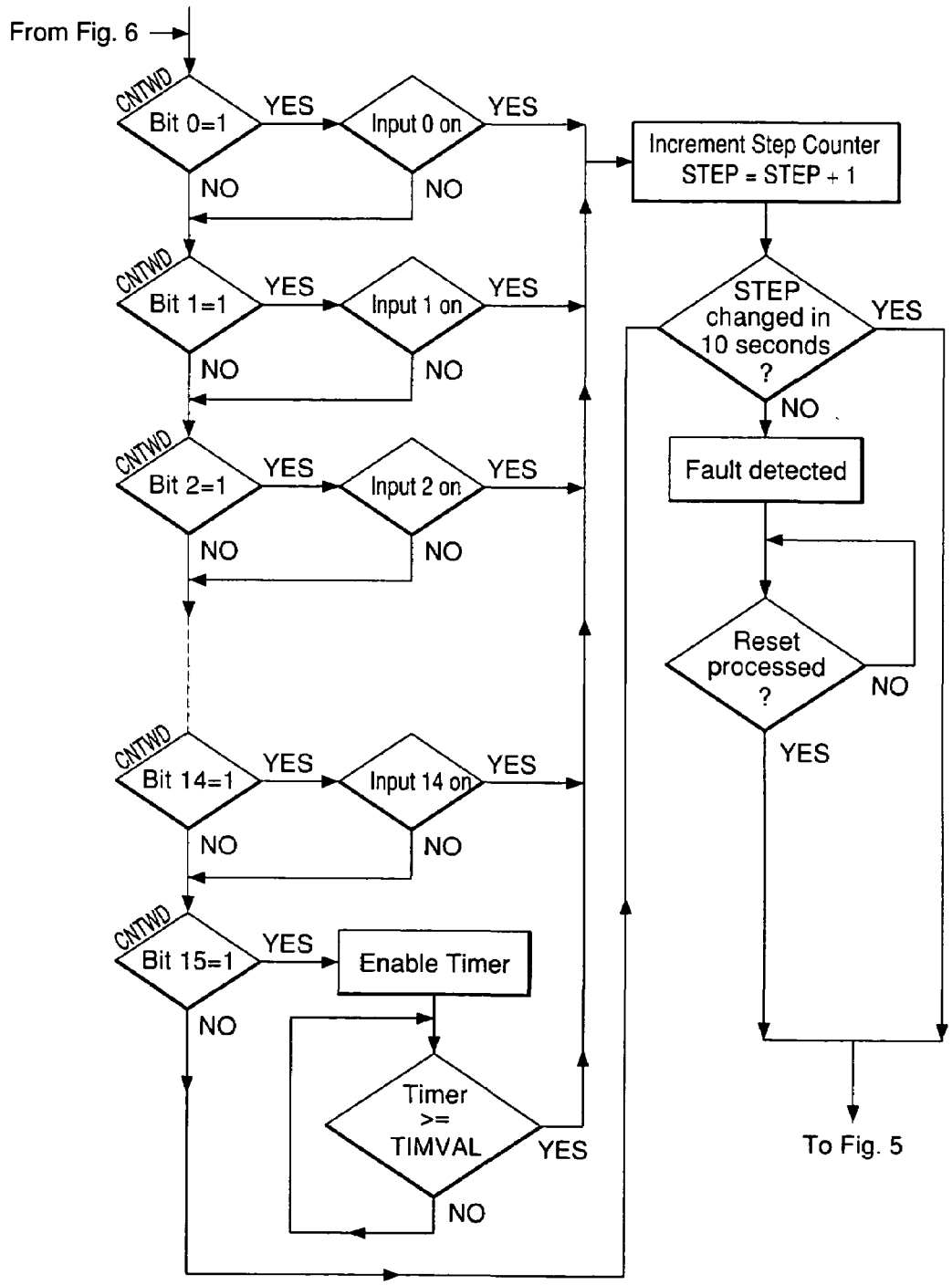

FIGS. 5–7 are flow charts illustrating the operation of an exemplary program that may be stored in the PLC 14 and control the PLC's operation in response to the contents of an input control data table, an output data table, timer value data table and an alarm code data table. The operating program preferably remains the same for each PLC 14 incorporating the preferred embodiment of the present invention, and only the data tables are changed (preferably using the graphical data entry user interface 20 of FIG. 2) in order to modify the operating parameters of the PLC 14. It should be apparent that this feature provides great advantages over reprogramming and debugging a PLC 14 each time that an operating parameter is changed.

The operating program for the PLC 14 may be written in ladder logic and downloaded to the PLC 14 to create a "generic PLC" that is programmable using output, input and timer value data tables either created using interface 20 of FIG. 2, or by other means, such as direct manual creation and download of the data tables and download to the PLC 14 without interface 20. Even though ladder logic programming is used to create the exemplary PLC operating program, creation of the operating program is a one time task and no knowledge of ladder logic programming is required to create or manipulate the output, input and timer value data tables to create a special purpose PLC 14 for controlling a process or portion of a process. Accordingly, the operating program may be created in other programming languages, such as C++, and downloaded to the PLC 14.

Referring to FIG. 5, the PLC 14 first checks the value of a step counter. The step counter begins at zero when the program begins execution. If the value of the step counter is zero, then variables OUTWD, CNTWD, and TIMVAL are set to the bit pattern or value of the output data element, the input control data element, and the timer value for STEP0, respectively. As mentioned above and referring to FIGS. 3 and 4, WORD10 is the output data element for STEP0, WORD50 is the input control data element for STEP0, and TIMER0 is the timer value data element for STEP0. As can be seen in FIG. 7, the step counter is incremented each time that the PLC 14 is ready to execute the next step 26.

It should be apparent from FIG. 5 that the input control data elements, output data element, and timer value data elements are retrieved from the input control data table, output data table and timer value data table, respectively, based upon the current value of the step counter. Accordingly, if the step counter is currently at thirty-one, then the OUTWD variable is set to the output data element of WORD41, the CNTWD variable is set to the input control data element of WORD81, and the TIMVAL variable is set to the timer value data element of TIMER31. If the step counter value is greater than 31, then the step counter is reset to zero, thereby restarting the entire process.

Once the OUTWD, CNTWD, and TIMVAL variables are set to the data elements for the step 26 identified by the current value of the step counter, the control program preferably operates as illustrated in FIG. 6. In FIG. 6, each bit of the variable OUTWD is checked. Any bit that is a "1" (i.e., a logical high) indicates that the output of the PLC 14 corresponding to that bit should be on for the current step, and any bit that is a "0" (i.e., a logical zero) indicates that the output of the PLC 14 corresponding to that bit should be off. Note that the "on" condition means an output signal is present at the output and an "off" condition means no output signal is produced at the output. If bit zero of OUTWD is a "1", output zero of the PLC 14 is turned on, if bit one of OUTWD is a "1", output one of the PLC is turned on, etc . . . Any output device 18 coupled to the outputs then responds according to its design. For example, a start light may turn on if coupled to an output signal and remain off if no output signal is present.

Once the outputs of the PLC 14 indicated by the OUTWD variable are turned on, the PLC preferably operates as illustrated in FIG. 7 where the CNTWD and TIMVAL variables are utilized. The CNTWD variable is used to increment the step counter, and the step counter does not increment until the condition or conditions identified by the CNTWD variable are satisfied. Bit zero of CNTWD is preferably examined first, although a random examination of the bits may also be used. In an exemplary embodiment of the present invention, if bit zero is a "1", then checkbox zero of the input control grid line 30 for the step 26 identified by the current value of the step counter is checked. As mentioned above, this configuration indicates that the user has directed the PLC 14 to increment to the next step when an input signal is detected at the input zero of the PLC 14. If an input signal is detected, the step counter is incremented by one as shown in FIG. 7. If the input signal is not yet detected at input zero of the PLC, bit one of CNTWD is examined to identify whether it is a "1". If it is not a "1", bit two of CNTWD is checked to identify whether it is a "1". If bit one of CNTWD is a "1", however, the PLC 14 checks to see whether an input signal is present at input one. If an input signal is present, then the step counter is incremented. This succession of examination steps accommodates both the Boolean OR and AND commands described above.

The significance of a "1" at bit fifteen preferably differs from the significance of a "1" at bits zero through fourteen in order to accommodate a timer enable command. As mentioned above in the description of the graphical data entry user interface 20, bit fifteen is a timer-enable command bit. If bit fifteen is a "1", then the PLC 14 enables its timer. The timer preferably begins its count from zero. The current value of the timer, indicated in FIG. 7 as TIMER, is then compared with the value of TIMVAL in a loop. If TIMER is greater than or equal to the value of TIMVAL (meaning the timer period selected by the user has expired) then the step counter is incremented by one.

If the step counter is incremented by one, or if none of the bits zero through fifteen is a "1", or if an input signal is not detected at any of the monitored inputs, then a default check routine is initiated. If the default routine does not determine that a default has occurred, the above-described process is repeated, starting with those steps illustrated in FIG. 5. If the step counter is incremented, then the output data element, input control data element and timer value data element for the next step 26 are utilized in FIGS. 5–7. If the step counter is not incremented, then the previously used output data element, input control data element and timer value data element are used for the OUTWD, CNTWD, and TIMVAL variables, respectively. These same data elements are used until either the step counter is incremented (i.e., an input signal is detected at a monitored input or TIMER is greater than or equal to TIMVAL) or a default is detected.

The default routine checks to see if the step counter has incremented within a predetermined period of time, such as ten seconds. This value may be a default value or be set by the user, but in any case should be larger than any timer values set by the user for a step 26 that is a timer step. If the step counter has changed within the predefined period of time, then the steps identified in FIG. 5 are executed. If the step counter has not changed within the predefined time period, then a fault is detected. A fault detect sound, a fault detect light, or other visual indicator connected to an output of the PLC 14 is then preferably triggered. Alternatively or additionally, an alarm code identifying the particular fault may be displayed on the operator display 19. Referring to FIG. 2 and interface 20, the user may select an alarm code 38 for each step 26. Each alarm code preferably has a specific meaning, either set by the user or taken from a master list of alarm codes. If a default is detected, for example at STEP1, then the PLC 14 accesses an alarm table generated from the interface 20 in the manner described above for the timer value data table. The PLC 14 accesses the alarm code from the alarm table for STEP1, i.e., alarm code data element one.

As can be seen in FIG. 2, an alarm code of "12" is shown selected for STEP1. An alarm code of "12" may then be displayed on the operator display 19 whereby the user may then look up the significance of an alarm code 12 or the significance of the code may be determined by the operator display 19 and be displayed to the user. For example, an alarm code "12" may signify an extend fault for the pneumatic press example described above. The alarm code also indirectly identifies to the user the programming step at which the default occurred. If a default is detected, a reset button connected to the PLC is preferably continuously checked to see if it has been pressed. Once the reset button is pressed, the process can either continue from the current step identified by the step counter or the step counter may be reset to zero to restart the process.

An exemplary graphical data entry user interface 20 also preferably includes a simulation or debug capability that may be used to insure that the data entered in the input control grid 22, output grid 24, timer values 28 and alarm codes 38 of the graphical data entry user interface 20 represent the correct operating parameters for the PLC 14. Once the inputs, outputs, timer values, and alarm codes are selected by the user in user interface 20, the output data table, input control data table, timer value data table, and alarm code data table are downloaded to the PLC 14. The inputs and outputs of the PLC 14 are coupled to the correct input devices 16 and output devices 18, except that the user interface 20 serves as the source of a start signal for the PLC 14. During real world operation, this start signal would typically come from a start button 16 or a central processor as described above in connection with the CONFIG. window 44.

The user may send the start signal to the PLC 14 by selecting the START SET and START CLR window 46. By first pressing the START SET window and then the START CLR window, a start signal is toggled as an input to the PLC 14, and the PLC 14 then operates according to the data elements of the output, input control, timer value, and alarm code data tables. The user may identify the step 26 that the PLC 14 is currently executing by selecting the UPDATE window 48. The step 26 that the PLC is executing is then highlighted on the user interface 20, and any defaults detected by the PLC 14 are displayed to the user in ALARM window 50 (if an alarm code 38 was selected by the user for that particular step 26). Pressing the RESET SET and then RESET CLR windows 52 is the equivalent of pressing the RESET button described in connection with FIG. 7. The action clears any alarms currently set and allows the programmed steps to continue.

An exemplary graphical data entry user interface 20 also preferably includes a second simulation mode that may be used to check that the outputs of the PLC 14 are triggered in the correct sequence. Once the user interface 20 is configured, the output data table, timer value data table, and alarm code data table are downloaded to the PLC 14. The outputs of the PLC 14 are coupled to the correct output devices 18. The user may then select the sequential step mode by selecting the STEP ON window 62. Conversely, the STEP OFF window 64 may be used to turn this "step" mode off. The user manually sequences the PLC 14 through the programmed steps 26 using the STEP windows 60. For example, STEP 0 is executed the first time that the user selects the STEP window 60. The PLC does not check its inputs, timer inputs or otherwise, but rather produces the outputs dictated for STEP 0 by the downloaded output data table until the user again selects the STEP window 60, at which time the PLC 14 produces the outputs dictated for STEP 1. As described above, the step 26 that is currently being executed by the PLC 14 is also highlighted on the user interface 20, and any defaults detected during a step 26 are displayed to the user in ALARM window 50, if an alarm code 38 was selected by the user for that particular step 26. By using this simulation mode, the user may manually step through the programmed process and examine the process step-by-step in order to observe that the correct outputs are triggered by the PLC 14 at the correct output devices 18 in the correct sequence.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provided a unique device that operates analogously to specific logic circuits.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A method of programming a programmable logic controller to direct a process, said programmable logic controller including a plurality of inputs and a plurality of outputs, said programmable logic controller directing said process through output signals at said outputs in response to input signals at said inputs, comprising the steps of:
   displaying to a user on a monitor a graphical data entry user interface for a plurality of sequential steps to be directed by said programmable logic controller, said graphical data entry user interface representing respective inputs to be monitored by said programmable logic controller at each of said sequential steps and respective outputs to be initiated by said programmable logic controller at respective ones of said sequential steps;
   receiving for said process, via said graphical data entry user interface, an identification of at least one input selected by said user to be monitored for at least one of said sequential steps and an identification of at least one output selected by said user to be initiated for said at least one of said sequential steps;
   converting said identification of said at least one input selected by said user into an input control data table, said input control data table including a plurality of input control data elements, each of said input control data elements corresponding to a respective one of said plurality of sequential steps, a respective one of said input control data elements representing said at least one input selected by said user; and
   converting said identification of said at least one output selected by said user into an output data table, said output data table including a plurality of output data elements, each of said output data elements corresponding to a respective one of said plurality of sequential steps, a respective one of said output data elements representing said at least one output selected by said user.

2. The method of claim 1, wherein said graphical data entry user interface includes a timer enable command option for each of said plurality of sequential steps and a timer value option for each of said plurality of sequential steps.

3. The method of claim 2, further comprising the steps of:
   receiving, via said graphical data entry user interface, a selection by said user of a timer enable command for at least one of said plurality of sequential steps;
   receiving, via said graphical data entry user interface, a selection by said user of a timer value for said at least one of said plurality of sequential steps; and
   creating a timer value data table including at least one timer value data element, said timer value data element representing said timer value,
   wherein a respective one of said input control data elements represents said timer enable command for said one of said sequential steps.

4. The method of claim 3, wherein said input control data element includes a plurality of bits, a subset of said plurality of bits representing individual inputs of said programmable logic controller and at least a remaining one of said plurality of bits representing said timer enable command.

5. The method of claim 1, wherein said input control data element includes a plurality of bits and a subset of said plurality of bits represents individual inputs of said programmable logic controller.

6. The method of claim 1, wherein said graphical data entry user interface is a check grid.

7. The method of claim 1, further comprising the step of downloading said input control data table and said output data table to said programmable logic controller.

8. The method of claim 1, wherein said output data element includes a plurality of bits and a subset of said plurality of bits represents individual outputs of said programmable logic controller.

9. An apparatus for programming a programmable logic controller to direct a process, said programmable logic controller including a plurality of inputs and a plurality of outputs, said programmable logic controller directing said process through output signals at said outputs in response to input signals at said inputs, comprising:
   means for displaying to a user on a monitor a graphical data entry user interface for a plurality of sequential steps to be directed by said programmable logic controller, said graphical data entry user interface representing respective inputs to be monitored by said programmable logic controller at each of said sequential steps and respective outputs to be initiated by said programmable logic controller at respective ones of said sequential steps;
   means for receiving for said process, via said graphical data entry user interface, an identification of at least one input selected by said user to be monitored for at least one of said sequential steps and an identification of at least one output selected by said user to be initiated for said at least one of said sequential steps;
   means for converting said identification of said at least one input selected by said user into an input control data table, said input control data table including a plurality of input control data elements, each of said input control data elements corresponding to a respective one of said plurality of sequential steps, a respective one of said input control data elements representing said at least one input selected by said user; and means for converting said identification of said at least one output selected by said user into an output data table, said output data table including a plurality of output data elements, each of said output data elements corresponding to a respective one of said plurality of sequential steps, a respective one of said output data elements representing said at least one output selected by said user.

10. The apparatus of claim 9, wherein said graphical data entry user interface includes a timer enable command option for each of said plurality of sequential steps and a timer value option for each of said plurality of sequential steps.

11. The apparatus of claim 10, further comprising:
means for receiving, via said graphical data entry user interface, a selection by said user of a timer enable command for at least one of said plurality of sequential steps;
means for receiving, via said graphical data entry user interface, a selection by said user of a timer value for said at least one of said plurality of sequential steps; and
means for creating a timer value data table including at least one timer value data element, said timer value data element representing said timer value,
wherein a respective one of said input control data elements represents said timer enable command for said one of said sequential steps.

12. The apparatus of claim 11, wherein said input control data element includes a plurality of bits, a subset of said plurality of bits representing individual inputs of said programmable logic controller and at least a remaining one of said plurality of bits representing said timer enable command.

13. The apparatus of claim 9, wherein said input control data element includes a plurality of bits and a subset of said plurality of bits represents individual inputs of said programmable logic controller.

14. The apparatus of claim 9, wherein said graphical data entry user interface is a check grid displayed on said monitor.

15. The apparatus of claim 9, further comprising means for downloading said input control data table and said output data table to said programmable logic controller.

16. The apparatus of claim 9, wherein said output data element includes a plurality of bits and a subset of said plurality of bits represents individual outputs of said programmable logic controller.

17. A computer-readable medium encoded with a computer program code that when executed by a processor causes the processor to program a programmable logic controller to direct a process, said programmable logic controller including a plurality of inputs and a plurality of outputs, said programmable logic controller directing said process through output signals at said outputs in response to input signals at said inputs, the medium comprising:
a first code segment for displaying to a user on a monitor a graphical data entry user interface for a plurality of sequential steps to be directed by said programmable logic controller, said graphical data entry user interface representing respective inputs to be monitored by said programmable logic controller at each of said sequential steps and respective outputs to be initiated by said programmable logic controller at respective ones of said sequential steps;
a second code segment for receiving for said process, via said graphical data entry user interface, an identification of at least one input selected by said user to be monitored for at least one of said sequential steps and an identification of at least one output selected by said user to be initiated for said at least one of said sequential steps;
a third code segment for converting said identification of said at least one input selected by said user into an input control data table, said input control data table including a plurality of input control data elements, each of said input control data elements corresponding to a respective one of said plurality of sequential steps, a respective one of said input control data elements representing said at least one input selected by said user; and
a fourth code segment for converting said identification of said at least one output selected by said user into an output data table, said output data table including a plurality of output data elements, each of said output data elements corresponding to a respective one of said plurality of sequential steps, a respective one of said output data elements representing said at least one output selected by said user.

18. The computer-readable medium of claim 17, wherein said graphical data entry user interface includes a timer enable command option for each of said plurality of sequential steps and a timer value option for each of said plurality of sequential steps.

19. The computer-readable medium of claim 18, further comprising:
a fifth code segment for receiving, via said graphical data entry user interface, a selection by said user of a timer enable command for at least one of said plurality of sequential steps;
a sixth code segment for receiving, via said graphical data entry user interface, a selection by said user of a timer value for said at least one of said plurality of sequential steps; and
a seventh code segment for creating a timer value data table including at least one timer value data element, said timer value data element representing said timer value,
wherein a respective one of said input control data elements represents said timer enable command for said one of said sequential steps.

20. A method of programming a programmable logic controller to direct a process, said programmable logic controller directing said process through output signals at outputs coupled to said programmable logic controller in response to input signals at inputs coupled to said programmable logic controller, comprising the steps of:
displaying to a user on a monitor a graphical data entry user interface representing a plurality of programmable sequential steps for programming by said user to be executed by said programmable logic controller in directing a process, said graphical data entry user interface representing a plurality of inputs for selection by said user to be monitored by said programmable logic controller at each of said programmable sequential steps and a plurality of outputs for selection by said user to be initiated by said programmable logic controller at each of said programmable sequential steps;
for each step of a control program being programmed by said user via said graphical data entry user interface requiring monitoring of inputs and/or initiation of outputs coupled to said programmable logic controller, receiving an identification of any inputs selected by said user to be monitored and an identification of any outputs selected by said user to be initiated, each step of said control program being programmed by said user corresponding to a respective step from said plurality of programmable sequential steps from said graphical data entry user interface; and converting said identifications of said inputs and outputs selected by said user into data elements to be provided to said programmable logic controller for execution as part of said control program.

21. The method of claim 20, wherein said graphical data entry user interface includes a timer enable command option for at least some of said plurality of programmable sequential steps and a timer value option for said at least some of said plurality of programmable sequential steps.

22. The method of claim 21, further comprising the steps of:

receiving, via said graphical data entry user interface for said control program being programmed by said user, a selection by said user of a timer enable command for at least one of said plurality of programmable sequential steps;

receiving, via said graphical data entry user interface, a selection by said user of a timer value for said at least one of said plurality of programmable sequential steps; and converting said timer enable command and timer value selections into data elements to be provided to said programmable logic controller for execution as part of said control program.

23. The method of claim 22, wherein said identification of said inputs selected by said user are converted into an input control data table including a plurality of input control data elements, each of said input control data elements corresponding to a respective step of said control program, wherein each input control data element includes a plurality of bits, a subset of said plurality of bits representing individual inputs coupled to said programmable logic controller and at least a remaining one of said plurality of bits representing said timer enable command.

24. The method of claim 20, wherein said identification of said inputs selected by said user are converted into an input control data table including a plurality of input control data elements, each of said input control data elements corresponding to a respective step of said control program, wherein each input control data element includes a plurality of bits, a subset of said plurality of bits representing individual inputs coupled to said programmable logic controller.

25. The method of claim 20, wherein said graphical data entry user interface includes, for each of said programmable sequential steps, selectable graphical identifiers representing each respective one of said plurality of inputs for selection by said user and selectable graphical identifiers representing each respective one of said plurality of outputs for selection by said user.

26. The method of claim 25, wherein said graphical data entry user interface comprises a check grid comprising said selectable graphical identifiers with respective grid elements associated with said plurality of inputs for selection by said user and said plurality of outputs for selection by said user.

27. The method of claim 20, further comprising the step of downloading said data elements to said programmable logic controller.

28. The method of claim 20, wherein said identification of said outputs selected by said user are converted into an output data table including a plurality of output data elements, each of said output data elements corresponding to a respective step of said control program, wherein each output data element includes a plurality of bits and a subset of said plurality of bits represents individual outputs coupled to said programmable logic controller.

29. An apparatus for programming a programmable logic controller to direct a process, said programmable logic controller directing said process through output signals at outputs coupled to said programmable logic controller in response to input signals at inputs coupled to said programmable logic controller, comprising:

means for displaying to a user on a monitor a graphical data entry user interface representing a plurality of programmable sequential steps for programming by said user to be executed by said programmable logic controller in directing a process, said graphical data entry user interface representing a plurality of inputs for selection by said user to be monitored by said programmable logic controller at each of said programmable sequential steps and a plurality of outputs for selection by said user to be initiated by said programmable logic controller at each of said programmable sequential steps;

means for receiving, for each step of a control program being programmed by said user via said graphical data entry user interface requiring monitoring of inputs and/or initiation of outputs coupled to said programmable logic controller, an identification of any inputs selected by said user to be monitored and an identification of any outputs selected by said user to be initiated, each step of said control program being programmed by said user corresponding to a respective step from said plurality of programmable sequential steps from said graphical data entry user interface; and means for converting said identifications of said inputs and outputs selected by said user into data elements to be provided to said programmable logic controller for execution as part of said control program.

30. The apparatus of claim 29, wherein said graphical data entry user interface includes a timer enable command option for at least some of said plurality of programmable sequential steps and a timer value option for said at least some of said plurality of programmable sequential steps.

31. The apparatus of claim 30, further comprising:

means for receiving, via said graphical data entry user interface for said control program being programmed by said user, a selection by said user of a timer enable command for at least one of said plurality of programmable sequential steps;

means for receiving, via said graphical data entry user interface, a selection by said user of a timer value for said at least one of said plurality of programmable sequential steps; and means for converting said timer enable command and timer value selections into data elements to be provided to said programmable logic controller for execution as part of said control program.

32. The apparatus of claim 31, wherein said identification of said inputs selected by said user are converted into an input control data table including a plurality of input control data elements, each of said input control data elements corresponding to a respective step of said control program, wherein each input control data element includes a plurality of bits, a subset of said plurality of bits representing individual inputs coupled to said programmable logic controller and at least a remaining one of said plurality of bits representing said timer enable command.

33. The apparatus of claim 29, wherein said identification of said inputs selected by said user are converted into an input control data table including a plurality of input control data elements, each of said input control data elements corresponding to a respective step of said control program, wherein each input control data element includes a plurality of bits, a subset of said plurality of bits representing individual inputs coupled to said programmable logic controller.

34. The apparatus of claim 29, wherein said graphical data entry user interface includes, for each of said programmable sequential steps, selectable graphical identifiers representing each respective one of said plurality of inputs for selection by said user and selectable graphical identifiers representing each respective one of said plurality of outputs for selection by said user.

35. The apparatus of claim 34, wherein said graphical data entry user interface comprises a check grid comprising said selectable graphical identifiers with respective grid elements associated with said plurality of inputs for selection by said user and said plurality of outputs for selection by said user.

36. The apparatus of claim 29, further comprising means for downloading said data elements to said programmable logic controller.

37. The apparatus of claim 29, wherein said identification of said outputs selected by said user are converted into an output data table including a plurality of output data elements, each of said output data elements corresponding to a respective step of said control program, wherein each output data element includes a plurality of bits and a subset of said plurality of bits represents individual outputs coupled to said programmable logic controller.

38. A computer-readable medium encoded with program code that when executed by a processor causes the processor to program a programmable logic controller to direct a process, said programmable logic controller directing said process through output signals at outputs coupled to said programmable logic controller in response to input signals at inputs coupled to said programmable logic controller, comprising:
  a first code segment for displaying to a user on a monitor a graphical data entry user interface representing a plurality of programmable sequential steps for programming by said user to be executed by said programmable logic controller in directing a process, said graphical data entry user interface representing a plurality of inputs for selection by said user to be monitored by said programmable logic controller at each of said programmable sequential steps and a plurality of outputs for selection by said user to be initiated by said programmable logic controller at each of said programmable sequential steps;
  a second code segment for receiving, for each step of a control program being programmed by said user via said graphical data entry user interface requiring monitoring of inputs and/or initiation of outputs coupled to said programmable logic controller, an identification of any inputs selected by said user to be monitored and an identification of any outputs selected by said user to be initiated, each step of said control program being programmed by said user corresponding to a respective step from said plurality of programmable sequential steps from said graphical data entry user interface; and
  a third code segment for converting said identifications of said inputs and outputs selected by said user into data elements to be provided to said programmable logic controller for execution as part of said control program.

39. The medium of claim 38, wherein said graphical data entry user interface includes a timer enable command option for at least some of said plurality of programmable sequential steps and a timer value option for said at least some of said plurality of programmable sequential steps.

40. The medium of claim 39, further comprising:
  a fourth code segment for receiving, via said graphical data entry user interface for said control program being programmed by said user, a selection by said user of a timer enable command for at least one of said plurality of programmable sequential steps;
  a fifth code segment for receiving, via said graphical data entry user interface, a selection by said user of a timer value for said at least one of said plurality of programmable sequential steps; and
  a sixth code segment for converting said timer enable command and timer value selections into data elements to be provided to said programmable logic controller for execution as part of said control program.

41. The medium of claim 38, wherein said graphical data entry user interface includes, for each of said programmable sequential steps, selectable graphical identifiers representing each respective one of said plurality of inputs for selection by said user and selectable graphical identifiers representing each respective one of said plurality of outputs for selection by said user.

42. The medium of claim 41, wherein graphical data entry user interface comprises a check grid comprising said selectable graphical identifiers with respective grid elements associated with said plurality of inputs for selection by said user and said plurality of outputs for selection by said user.

43. The medium of claim 38, further comprising a fourth code segment for downloading said data elements to said programmable logic controller.

44. A method of programming a programmable logic controller to direct a process, said programmable logic controller directing said process through output signals at outputs coupled to said programmable logic controller in response to input signals at inputs coupled to said programmable logic controller, comprising the steps of:
  displaying to a user on a monitor a graphical data entry user interface displaying a plurality of programmable sequential steps for programming by said user to be executed by said programmable logic controller in directing a process, said graphical data entry user interface including selectable identifiers for a plurality of inputs for selection by said user to be monitored by said programmable logic controller at each of said programmable sequential steps and selectable identifiers for a plurality of outputs for selection by said user to be initiated by said programmable logic controller at each of said programmable sequential steps;
  for a control program being programmed by said user via said graphical data entry user interface requiring monitoring of inputs and/or initiation of outputs coupled to said programmable logic controller, receiving via said selectable identifiers an identification of any inputs selected by said user to be monitored and an identification of any outputs selected by said user to be initiated for steps in said control program, each step of said control program being programmed by said user corresponding to a respective programmable sequential step from said plurality of programmable sequential steps from said graphical data entry user interface;
  wherein said graphical data entry user interface includes a timer enable command option for each of said plurality of programmable sequential steps and a timer value option for each of said plurality of programmable sequential steps, said method further comprising the steps of:

receiving, via said graphical data entry user interface, a selection by said user of a timer enable command for at least one of said plurality of programmable sequential steps;

receiving, via said graphical data entry user interface, a selection by said user of a timer value for said at least one of said plurality of programmable sequential steps; and converting said inputs and outputs selected by said user and said timer enable command and time value selected by said user into data elements to be provided to said programmable logic controller for execution as part of said control program.

45. The method of claim 44, further comprising the step of downloading said data elements to said programmable logic controller.

* * * * *